United States Patent [19]

Morita et al.

[11] Patent Number: 4,938,189
[45] Date of Patent: Jul. 3, 1990

[54] AUTOMATIC IGNITION CONTROL SYSTEM

[75] Inventors: Yoshio Morita, Saitama; Shigeaki Kuwabara, Higashikurume; Hiroshi Watabe, Fuchu, all of Japan

[73] Assignees: Shindengen Electric Manufacturing Co., Ltd.; Honda Giken Kogyo Kabushiki Kaisha, both of Tokyo, Japan

[21] Appl. No.: 384,144

[22] Filed: Jul. 24, 1989

[30] Foreign Application Priority Data

Jul. 29, 1988 [JP] Japan .................. 63-188099
Jul. 29, 1988 [JP] Japan .................. 63-188100

[51] Int. Cl.⁵ .......................................... F02P 5/145
[52] U.S. Cl. ........................... 123/335; 123/198 DC
[58] Field of Search ........... 123/335, 198 D, 198 DC, 123/596, 599, 602

[56] References Cited

U.S. PATENT DOCUMENTS

| | | | |
|---|---|---|---|
| 4,459,951 | 7/1984 | Tobinaga et al. | 123/335 X |
| 4,594,978 | 6/1986 | Kanno | 123/335 |
| 4,625,689 | 12/1986 | Komurasaki | 123/335 |
| 4,641,618 | 2/1987 | Dogadko et al. | 123/335 |
| 4,733,644 | 3/1988 | Staerzl | 123/335 X |

FOREIGN PATENT DOCUMENTS

| | | | |
|---|---|---|---|
| 0010772 | 1/1982 | Japan . | |
| 0002471 | 1/1983 | Japan . | |
| 0168273 | 9/1984 | Japan | 123/335 |

Primary Examiner—Willis R. Wolfe
Attorney, Agent, or Firm—Stevens, Davis, Miller & Mosher

[57] ABSTRACT

An engine ignition control system comprising an ignition circuit of capacitor charge-discharge type is disclosed in which the ignition timing is determined by controlling the charge-discharge cycle of a capacitor by an output signal from an engine speed detection circuit. An overspeed control circuit stops the ignition when a detection output signal of the engine speed detection circuit exceeds a reference voltage level corresponding to a set engine speed. A slowing down control circuit is actuated in response to an engine slowing down operation start switch for realizing a hypothetical condition substantially equivalent to the one in which the engine speed detection circuit detects an engine speed higher than the actual engine speed thereby to accomplish engine slowing down operation by (a) increasing the reference voltage level gradually, or (b) increasing the output signal level of the engine speed detection circuit stepwise.

8 Claims, 7 Drawing Sheets

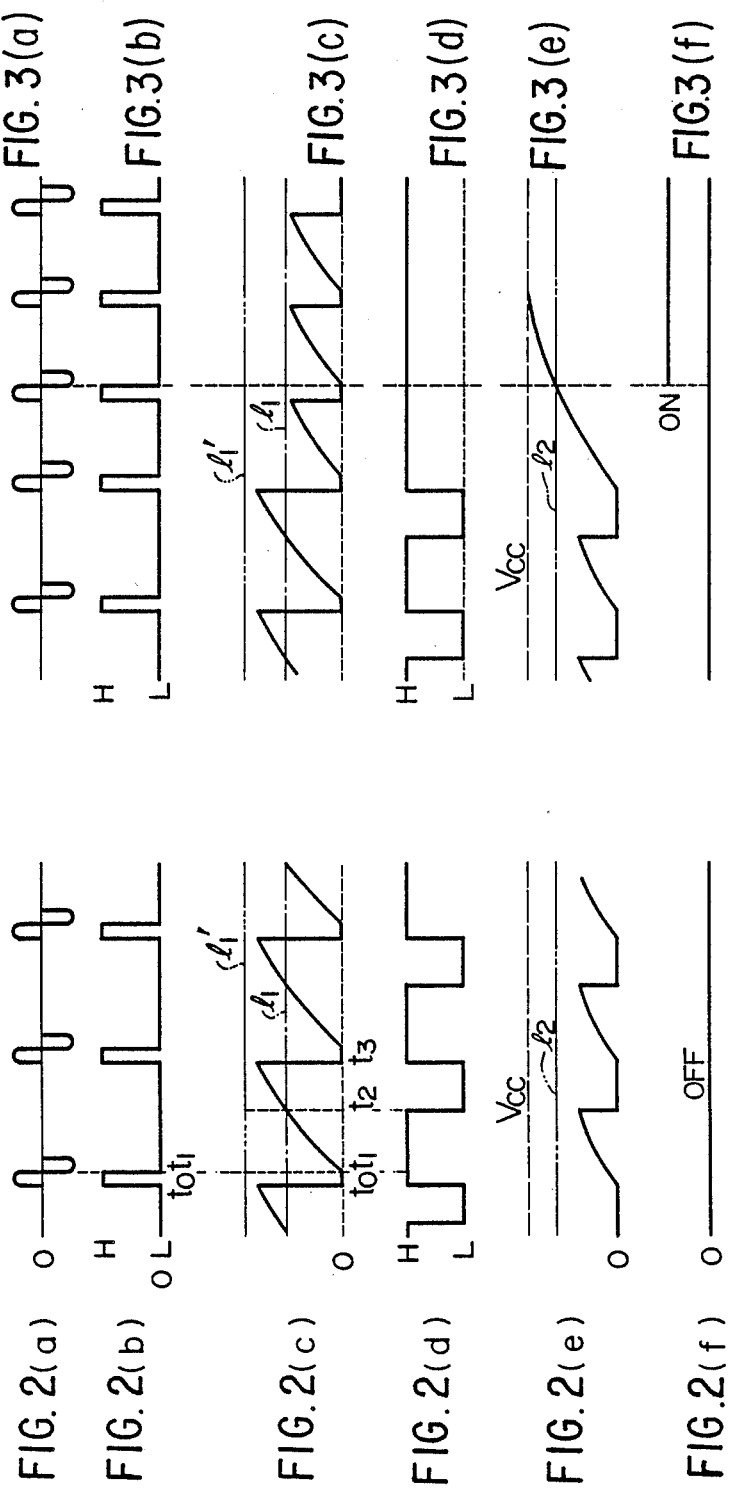

FIG.4 (a)
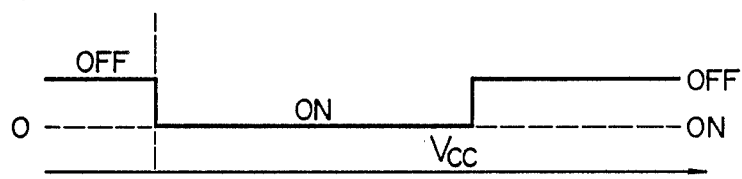
FIG.4 (b)
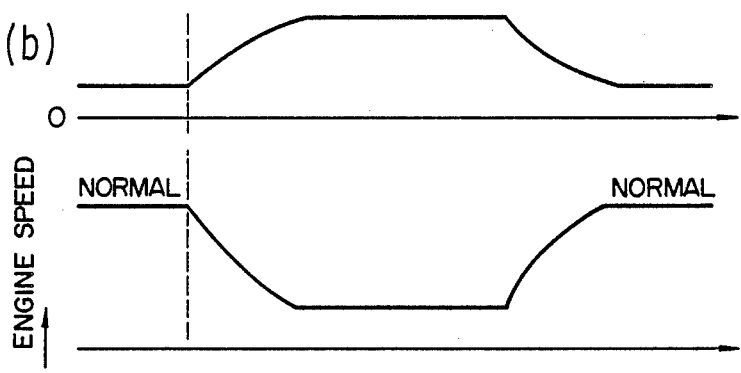
FIG.4 (c)

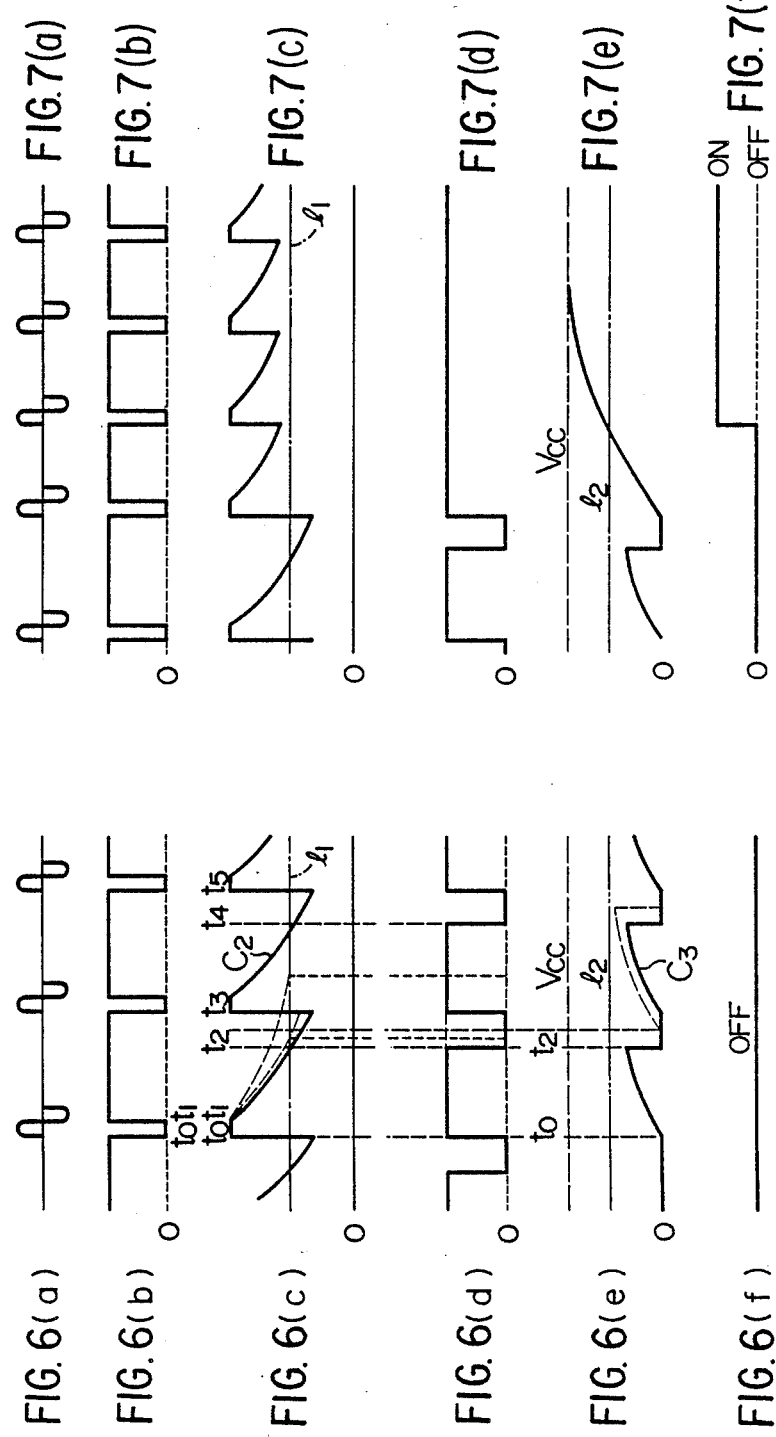

AUTOMATIC IGNITION CONTROL SYSTEM

BACKGROUND OF THE INVENTION

The present invention relates to an automatic ignition control system of an engine used with an outboard motor for small marine vessels.

In stopping a small marine vessel or the like automatically upon detection of the engine thereof overheated in operation, an abrupt engine stop may subject the hull to a great shock by sudden deceleration due to the resistance from the water surface. In view of this, a method has been suggested to reduce the engine speed by stopping the ignition of a part of cylinders when an engine overheat is detected. (JP-A No. 57-10772). If the number of cylinders is small or depending on the type of the engine involved, however, the engine speed sharply decreases undesirably without smooth deceleration of a cruising vessel.

In order to solve this problem, a device has also been suggested which comprises a temperature detector for detecting an overheated condition of an internal combustion engine and a circuit adapted to oscillate in response to an overheated condition of the engine, wherein the ignition is intermittently stopped for deceleration in accordance with the output of the oscillation circuit under an overheated condition of the engine (See JP-A No. 58-2471).

Although this device provides means for smooth engine deceleration, the engine is decelerated according to a uniform pattern. In applications to small marine vessels or the like with various hull resistances (resistances between hull and water surface), therefore, a deceleration of the hull would be too early or too late, thereby leading to the disadvantage that an elaborate consideration is required in setting a deceleration pattern.

SUMMARY OF THE INVENTION

Accordingly, it is an object of the present invention to provide a novel and improved system device and a method of automatic ignition control of an engine in which the amount of reduction in engine speed is controlled automatically in accordance with the degree of deceleration of the engine.

Another object of the invention is to provide a system and a method of automatic ignition control of an engine for a small marine vessel comprising an engine speed control system having, in particular, an ignition circuit of capacitor charge-discharge type, wherein the amount of reduction in engine speed is adapted to be controlled automatically in accordance with the degree of hull deceleration detected by engine speed detection means.

Still another object of the present invention is to provide a system and a method of automatic ignition control of an engine comprising an ignition circuit of capacitor charge-discharge type, wherein the engine speed is controlled automatically in such a manner as to prevent an unnecessarily sharp deceleration.

A further object of the present invention is to provide a system and a method of automatic ignition control of an engine of a small marine vessel, in which the engine speed is automatically controlled in such a manner as to prevent an unnecessarily sharp deceleration thereby to effect smooth engine deceleration regardless of the magnitude of the hull resistance.

The aforementioned objects of the present invention are effectively achieved by an automatic ignition control system comprising an ignition circuit of capacitor charge-discharge type according to an embodiment characterized, in particular, by an overspeed control circuit and a slowing down control circuit described below.

(i) An overspeed control circuit including first comparator means for comparing a detection output signal level of an engine speed detection circuit with a first reference voltage level corresponding to a set engine speed and second comparator means for comparing a difference output of the first comparator means with a second reference voltage level corresponding to a set engine speed level, the overspeed control circuit stopping the ignition when the difference output from the first comparator means exceeds the second reference voltage level; and (ii) A slowing down control circuit energized by an engine slowing down operation start means to increase the first set reference voltage level of the first comparator means of the overspeed control circuit, thus reducing the set engine speed, gradually, whereby the engine speed detection circuit is assumed to have equivalently detected an engine speed higher than an actual engine speed level, so that the ignition is stopped for a decelerated engine operation.

According to still another embodiment of the present invention, the above-mentioned object is achieved by configuring the overspeed control circuit and the slowing down speed control circuit in the manner mentioned below.

(i') An overspeed control circuit for stopping the ignition by the capacitor charge-discharge circuit when the detection output signal level produced from an engine speed detection circuit exceeds a first reference voltage level corresponding to a set engine speed.

(ii') A slowing down speed control circuit actuated by engine slowing down speed operation start means in which the slowing down operation of the engine is effected in a condition substantially equivalent to the detection of an engine speed higher than the actual engine speed by the engine speed detection circuit by increasing stepwise the detection output signal level from the engine speed detection circuit.

The above and other objects, features and advantages will be made apparent by the detailed description taken in conjunction with the accompanying drawings.

BRIEF DESCRIPTION OF THE DRAWINGS

FIGS. 2, 3 and 4 show waveforms for explaining the operation of the first embodiment, in which FIGS. 2(a) to (f) show waveforms of signals appearing at main parts when the engine speed decreases below a set value, FIGS. 3(a) to (f) are signal waveforms produced at the same main parts when the engine speed increases beyond a set value, and FIGS. 4(a), (b) and (c) shows signal waveforms produced at the same main parts when a slowing down operation start switch is turned on in the case where the engine speed is lower than a set value.

FIGS. 6 to 8 are diagrams showing waveforms for explaining the operation of the second embodiment, in which FIGS. 6(a) to (f), FIGS. 7(a) to (f) and FIGS. 8(a) to (e) correspond to FIGS. 2(a) to (f), FIGS. 3(a) to (f) and FIGS. 4(a) to (c) for the first embodiment respectively.

DESCRIPTION OF THE PREFERRED EMBODIMENTS

First Embodiment

Figure 1:
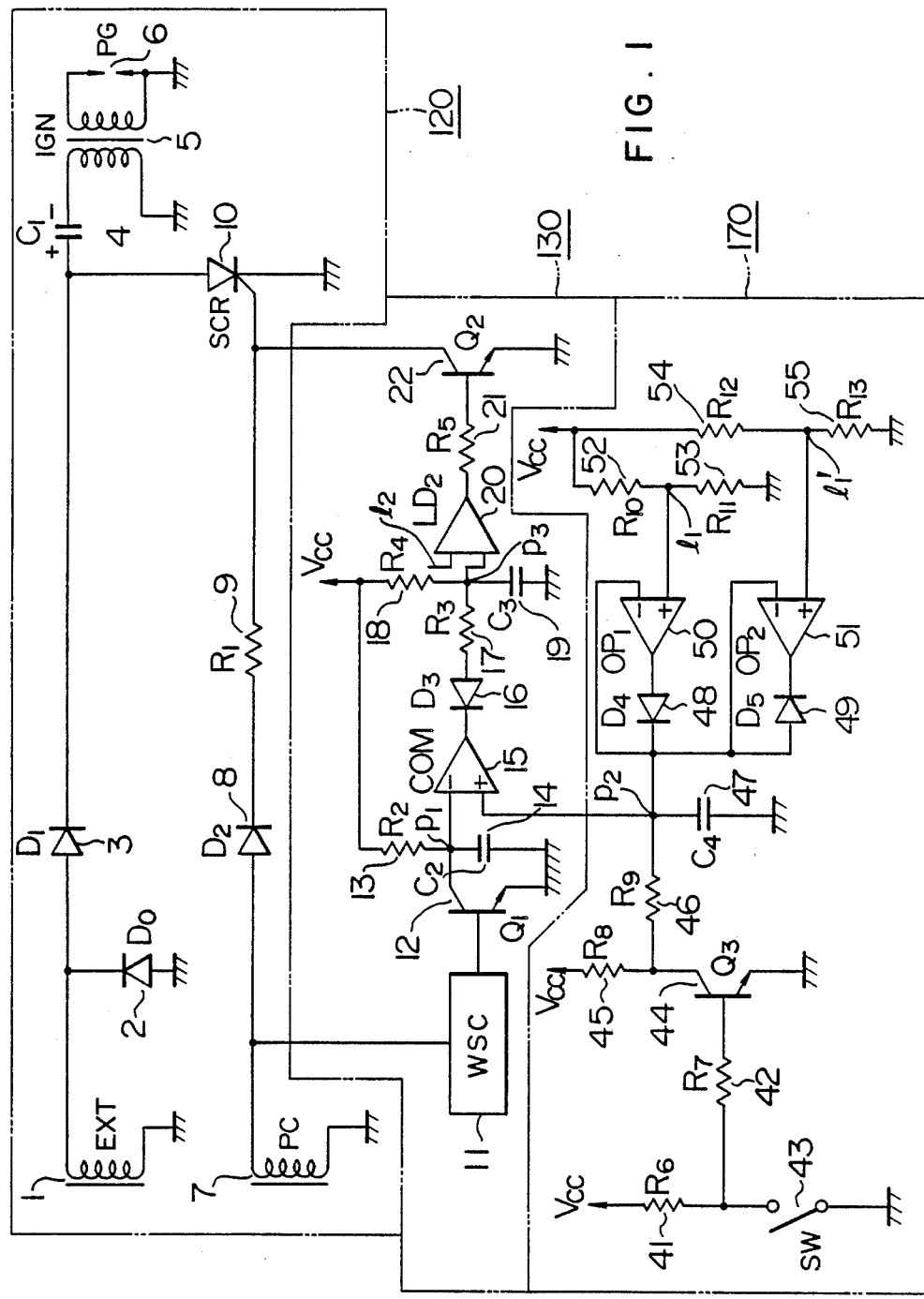
FIG. 1 is an electronic circuit diagram schematically showing an electrical configuration of an engine ignition control system according to an embodiment of the present invention.

An electronic circuit illustrating a general configuration of a first embodiment of the present invention is shown in FIG. 1. In FIG. 1, reference numeral 120 designates a basic circuit of a well-known ignition system of capacitor charge-discharge type made up of the following parts: Numeral 1 designates a voltage generation coil of an exciter (EXT) for producing by converting an output voltage of an AC generator not shown into a required voltage value, numeral 2 a flywheel diode ($D_0$), numeral 3 a rectification diode ($D_1$), numeral 4 a charge-discharge capacitor ($C_1$), numeral 5 an ignition coil (IGN), numeral 6 an ignition plug (PG), numeral 10 a discharge control thyristor (SCR), numeral 7 a timing signal generation coil (PC) for producing an AC signal of a cycle changing in proportion to the engine speed produced from an engine speed detector not shown, numeral 8 a reverse-blocking diode ($D_2$), numeral 9 a gate resistor ($R_1$), and character $V_{cc}$ a DC power supply.

Numerals 130 and 170 designate an overspeed control circuit and a slowing down control circuit of an engine, which respectively make up the essential parts of the present invention. These circuits are configured as mentioned below.

In the overspeed control circuit 130, numeral 11 designates a waveform shaping circuit (WSC) for producing an engine speed detection output signal which is at high level for the time width of signal production from the timing signal generation coil 7 and at low level for the remaining time. Numeral 14 designates an engine speed detection capacitor ($C_2$), numeral 12 a first transistor for charge-discharge control thereof ($Q_1$), numeral 13 a charging resistor ($R_2$), character $V_{cc}$ a DC power supply, numeral 15 a level comparator (COM), numeral 16 a switching diode ($D_3$), numeral 19 a misfire engine speed setting capacitor ($C_3$), numeral 17 a discharge resistor thereof ($R_3$), numeral 18 a charging resistor ($R_4$), numeral 20 a level detector ($LD_2$), numeral 21 a base current-limiting resistor ($R_5$), and numeral 22 a second transistor ($Q_2$) for controlling the thyristor (SCR) 10 of the ignition circuit.

In the slowing down control circuit 170, numeral 43 designates an engine slowing down coperation start switch (SW) which is adapted to turn on only when it is desirable to idle the engine in response to an output from an overheat detection sensor or the like not shown arranged on engine side. Numerals 41, 42 designate base current-limiting resistors ($R_6$, $R_7$), numeral 47 a detection level control capacitor ($C_4$) for the level detector (COM) 15, numerals 45, 46 charge-discharge resistors ($R_8$, $R_9$), and numeral 44 a third transistor ($Q_3$) for a charge-discharge control of the capacitor 47. Numerals 48, 49 designate switching diodes ($D_4$, $D_5$). Numerals 50, 51 designate operational amplifiers ($OP_1$), ($OP_2$) respectively, and numerals 52, 53, 54 and 55 voltage fetch resistors ($R_{10}$, $R_{11}$, $R_{12}$, $R_{13}$) for changing the detection level, which form a voltage holding circuit. More specifically, the lower limit value of the reference voltage level $P_2$ applied to the terminal $\oplus$ of the level comparator 15 is defined by the voltage $l_1$ divided by the resistors 52 and 53, and at the same time the voltage $l_1'$ divided by the resistors 54 and 55 is set higher than $l_1$ so that the upper limit value of the reference voltage level $P_2$ is defined by the divided voltage $l_1'$. Now, the operation of the first embodiment will be explained with reference to the waveform diagrams of the respective parts of the circuits shown in FIGS. 2, 3 and 4.

[I] When engine speed is lower than a set value under normal operating condition:

The charge-discharge capacitor 4 of the ignition circuit 120 is charged to the polarity shown by a DC voltage which is produced by rectifying an output voltage of the voltage generation coil 1 of the exciter through the diode 3. The gate of the thyristor 10, on the other hand, is impressed with an engine speed detection output signal shown in FIG. 2(a) produced from the timing signal generation coil 7. When a signal is applied to the gate thereof, the thyristor 10 is turned on so that a circuit of discharge from 4 $\oplus$ to parts 10 to the earth to the part 5 to the part 4 $\ominus$ is formed, and thus the capacitor 4 is discharged, with the result that a high voltage is generated across the secondary winding of the ignition coil 5 thereby to ignite the plug 6.

At the same time that the ignition plug 6 is ignited, a resonation circuit formed of the ignition coil 5 and the capacitor 4 charges the capacitor 4 to the polarity reverse to that for charging, so that the thyristor 10 is blocked by being biased reversely. As a result, charges in the capacitor 4 are discharged through a circuit formed of the parts 4 $\ominus$, 5, 2, 3 and 4 $\oplus$ in that order. Subsequently, during each time a gate signal of FIG. 2(a) is applied to the gate of the thyristor 10, the above-mentioned charge-discharge processes are repeated thereby to start the ignition plug in response to the engine speed.

The waveform shaping circuit 11, on the other hand, produces a "high" signal upon application thereto of a signal shown in FIG. 2(b) and a "low" signal during the remaining time, in response to an engine speed detection output signal shown in FIG. 2(a) from the timing signal generation coil 7. As a result, while the signal is "high", the first transistor 12 is turned on, so that the capacitor 14 is shorted during the period from $t_0$ to $t_1$ in FIG. 2(c), and during the period from $t_1$ to $t_3$ when the signal becomes "low", the transistor 12 is turned off, with the result that the capacitor 14 is charged by the DC power supply $V_{cc}$ through the resistor 13 for an increased charge voltage, followed by the transistor 12 being turned on with the charge voltage reduced to zero again. This process is repeated. Thus, the voltage level at one terminal $\ominus$ of the level comparator 15 impressed with the voltage of the capacitor 14 undergoes a similar change.

In view of the fact that the engine is under normal operating condition, the engine slowing down operation start switch 43 is off and the third transistor 44 is off. Therefore, the capacitor 47 is shorted through the resistor 46. The voltage across the capacitor 47 is maintained at the DC source voltage $V_{cc}$ as divided by the resistors 52 and 53, which is produced from the operational amplifier 50 through the switching diode 48. As a result, if the voltage divided by the resistors 52 and 53 is adjusted appropriately to select the divided voltage level $l_1$ as a voltage level of the capacitor 47, that is, a reference voltage level $P_2$ applied to the other terminal ⊕ of the level comparator 15 as shown in FIG. 2(c), then the level comparator 15 produces a "low" signal when the voltage of the capacitor 14 exceeds that of the capacitor 47 and a "high" signal for the rest of time as shown in FIG. 2(d). This divided voltage $l_1$ defines the lower limit value of the first reference voltage level $P_2$.

On the other hand, the capacitor 19 which is charged by the DC power supply $V_{cc}$ through the resistor 18 is suppressed to low level when the level comparator 15 produces a "low" signal. When the output level of the level comparator 15 becomes "high", however, the diode 16 is turned off by the reverse bias so that the capacitor 19 begins to be charged with a charging time constant determined by the resistor 18 and the capacitor 19 itself. The voltage level of the capacitor 19 steadily increases in the manner shown in FIG. 2(e) until it is reduced to zero when the output of the level comparator 15 becomes "low" as shown in FIG. 2(d) at time point $t_2$.

If the detection level of the level detector 20 is set to $l_2$ as shown in FIG. 2(e), therefore, the output level of the detector 20 becomes "low", and the second transistor 22 controlled thereby turns off continuously as shown in FIG. 2(f). As a result, the gate input of the thyristor 10 is not applied through a bypass, so that the plug ignition corresponding to the engine speed is continued thereby to continue the engine operation at a speed lower than a set value.

[II] When engine speed increases beyond a set value under normal operating condition:

Assume that the engine speed increases beyond a set value and the output signal cycle of the waveform shaping circuit 11 is shortened as shown in FIG. 3(b). Consequently, the charging time of the capacitor 14 is shortened as shown in FIG. 3(c), and the final charge voltage level thereof is reduced. This final charge voltage level becomes lower than the reference voltage level $P_2$ due to the capacitor 47 applied to the other terminal of the level comparator 15. As a consequence, the output of the level comparator 15 is kept at "high" level as shown in FIG. 3(d), and the switching diode 16 is kept continuously biased in reverse way. As a result, the capacitor 19 is charged continuously as shown in FIG. 3(e) until it becomes substantially equal to the voltage across the DC power supply $V_{cc}$ finally. When the charge voltage level exceeds the detection level $l_2$ of the level detector 20 during the process of charging the capacitor 19, the output level of the level detector 20 becomes "high". The second transistor 22 supplied with the output of the level detector 20 at the base thereof is thus turned on as shown in FIG. 3(f), so that the gate input of the thyristor 30 is passed through a bypass thereby to prevent a discharge circuit of the capacitor 4 from being formed. As a result, the plug 6 misfires. This condition is continued until the engine speed is restored to a set value, and therefore the overspeed condition is prevented.

[III] When the slowing down operation start switch 43 is turned on with engine speed less than a set value under normal operating condition:

Assume that the switch 43 for starting the slowing down operation is turned on upon detection of an overheated condition of the engine as shown in FIG. 4(a). The third transistor 44 turns off, and therefore the capacitor 47 begins to be charged by the DC power supply $V_{cc}$ through the resistors 45, 46, so that the voltage across the capacitor 47 which has thus far been held by a voltage divided by the resistors 52 and 53 as shown in FIG. 4(b) steadily increases from the time point when the switch 43 turns on. Assume that the voltage $l_1'$ divided by the resistors 54 and 55 is set to a higher level than the voltage $l_1$ divided by the resistors 52 and 53. The voltage across the capacitor 47, after gradually increasing to a voltage $l_1'$ divided by the resistors 54 and 55, becomes constant as shown in FIG. 4(b), and so that the voltage level applied to the ⊕ terminal of the level comparator 15 increases from the reference voltage level to $l_1'$ as shown by a three-point dotted chain in FIG. 2(c). In the process, the divided voltage $l_1'$ defines the upper limit value of the reference voltage level applied to the comparator 15. As a result, the output of the level comparator 15 continues to remain at high level thereby to increase the final charge voltage level of the capacitor 19. The level detector 20 is thus energized the same way as if an engine speed higher than the actual engine speed has been detected. The resulting detection of a level exceeding $l_2$ causes the gate input of the thyristor 10 to be applied through a bypass in order to prevent the overspeed, with the result that a discharge circuit of the capacitor 4 is prevented from being formed, thereby leading to a misfire. During the deceleration of the hull speed under this misfire condition, a detection output signal representing the "total" engine speed including the turning effort received by the engine from an inertial fluid is compared constantly with the detection level $l_2$ of the level detector 20, while the engine is steadily decelerated. If the deceleration is excessive, therefore, the misfire is suspended to operate the engine at low speed as shown in FIG. 4(c).

When the switch 43 is turned off as shown in FIG. 4(a), the turning on of the third transistor 44 causes the voltage across the capacitor 47 to slowly discharge to the voltage $l_1$ divided by the resistors 52 and 53 and the engine speed becomes gradually higher therewith, thus restoring the normal operation after reached the predetermined voltage level shown in FIG. 2(c). In the case where the engine is overheated, for example, the vessel may be run at low speed until the overheated condition is eliminated.

[IV] When the slowing down operation start switch is turned on with the engine speed exceeding a set value under normal operating condition:

As described in [II] above, the ignition plug is set in misfire state on the one hand, while as the result of turning on of the switch 43, the voltage appearing across the capacitor 47 is increased thereby to increase the detection output level $P_1$ of the engine speed detection circuit steadily in the same manner as if an engine speed higher than the actual engine speed has been detected, thereby gradually decreasing the engine speed, as explained in [III] above.

Figure 9:
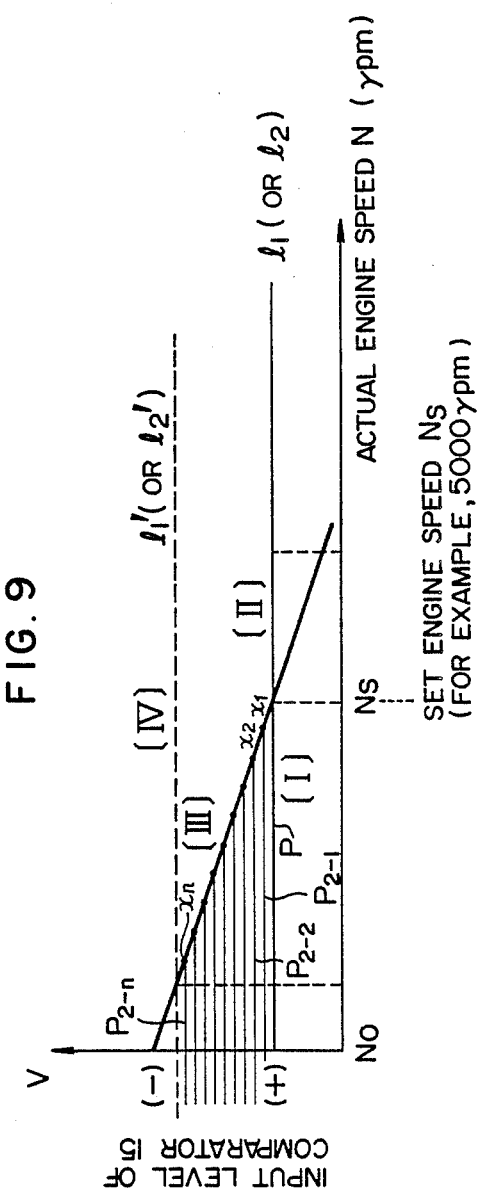
FIGS. 9 and 10 are schematic diagrams for explaining the correlationship between the four operation modes of the first and second embodiments respectively.

The above-mentioned four operation modes [I] to [IV] are summarized as mentioned below by reference to FIG. 9 schematically illustrating the correlationship therebetween. In FIG. 9, the ordinate represents the input level of (−) and (+) of the level comparator 15, and the abscissa the actual engine speed. First, in the mode [I] lower than the set engine speed $N_s$, the reference voltage level $P_2$ providing a (+) input, that is, the potential of the capacitor 47 is set to the lower limit value of the divided voltage $l_1$ of the resistors 52 and 53. Specifically, the potential $P_1$ of the capacitor 14 indicating the detection output level of the engine speed steadily decreases with the increase in actual engine speed. Since the potential $P_1$ of the capacitor 14 is always higher than the potential across the capacitor 47 and the capacitor 14 is also in discharging condition therewith, however, the second transistor 22 is off state, preventing a misfire. When the actual engine speed exceeds the set engine speed $N_s$ in mode [II], on the other hand, the reference voltage level $P_2$ providing the (+) input is still held at the voltage $l_1$ divided by the resistors 52 and 53. In view of the fact that the potential $P_1$ of the capacitor 14 providing the (−) input, however, is reduced below the potential of the capacitor 47 equal to the reference voltage level $P_2$ due to the increase in the actual engine speed, with the result that the second transistor 22 is turned on through the level comparator 15 thereby to effect a misfire. In mode [III], by contrast, assume that the slowing down operation start switch 43 is turned on before the actual engine speed reaches a set engine speed $N_s$. The reference voltage level $P_2$ of the capacitor 47 increases steadily with the increase in the actual engine speed ($P_{2-1}$, $P_{2-2}$, $P_{2-3}$, . . . , $P_{2-n}$), until when the actual engine speed $N_s'$ crossing the engine speed detection output level $P_1$ of the capacitor 14 is exceeded, and the second transistor 22 is turned on thereby to effect a misfire. This indicates that a misfire is effected in response to the same condition as if an engine speed $N_s$ is detected before the set engine speed $N_s$ is reached, that is, at an actual engine speed $N_s'$ than which the engine speed $N_3$ is higher. Under this condition, the reference voltage level $P_2$ of the capacitor 47 is confined by the upper limit value defined by the voltaged $l_1'$ divided by the resistors 54 and 55. Further, in mode [IV], the operation is the same as in mode [III].

As will be easily seen from the description of the first embodiment, according to the present invention, the amount of engine speed reduction is capable of being automatically controlled in accordance with the degree of hull deceleration detected by detection of the engine speed. Especially, the automatic control which can be effected to prevent a sharp deceleration more than necessary leads to the advantage that smooth deceleration is assured regardless of the magnitude of the hull resistance.

Second Embodiment

Figure 5:
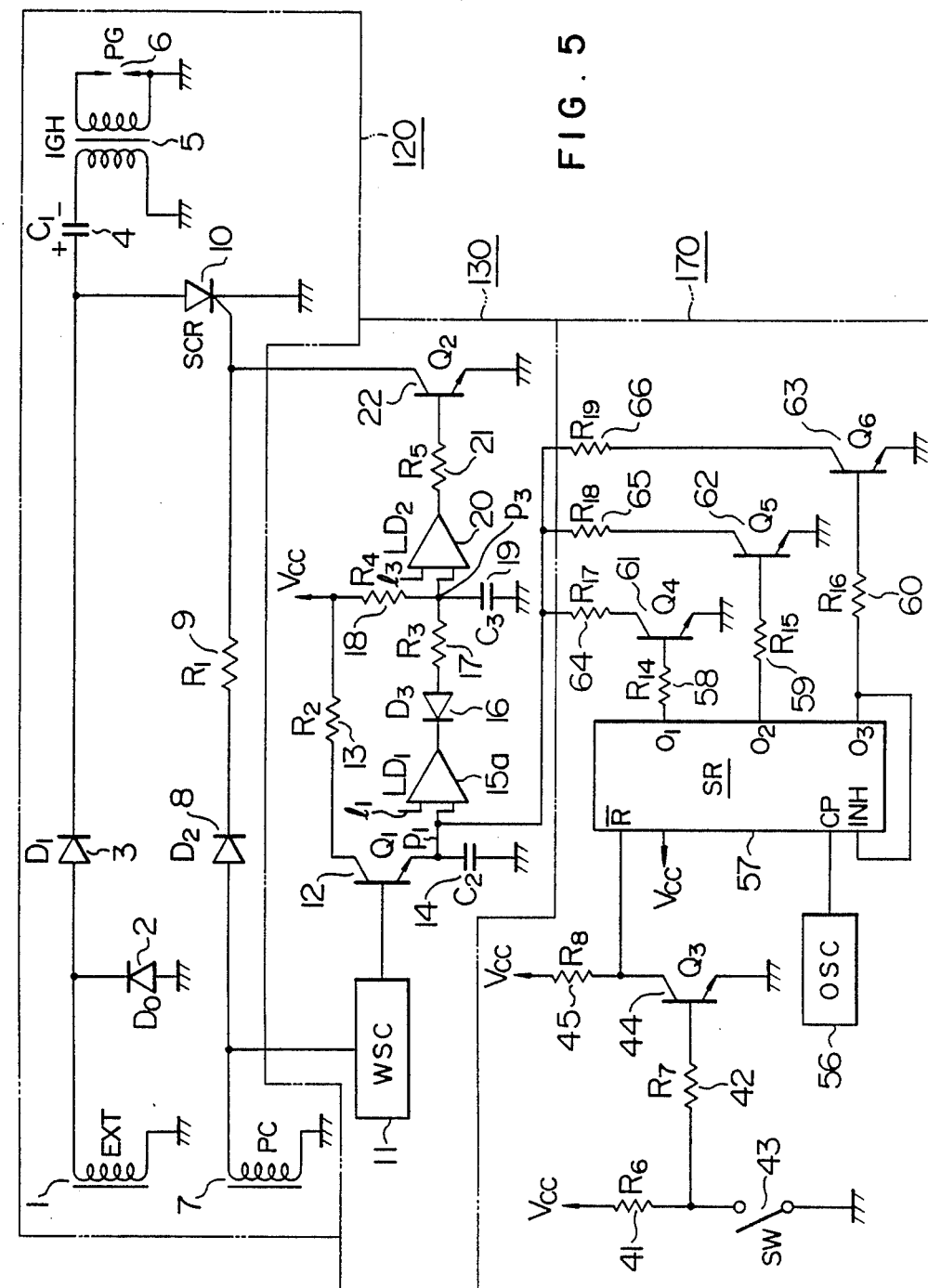
FIG. 5 is an electronic circuit diagram schematically showing an electrical configuration of an engine ignition control system according to a second embodiment of the present invention.

An electronic circuit representing a schematic configuration of the present invention embodying the basic concept thereof as a second embodiment is shown in FIG. 5. In FIG. 5, component parts equivalent to those in the first embodiment are designated by the same reference numerals as those for the latter. In FIG. 5, the well-known ignition system of charge-discharge type 120 and the overspeed control circuit 30 have exactly the same configurations as the corresponding parts of FIG. 1 respectively, and therefore will not be explained again.

In the slowing down control circuit 170, numeral 43 designates a switch (SW) for starting a slowing down operation of the engine, which is adapted to turn on only under such a state as it is desirable to slow down the engine in response to an output of an overheat detection sensor or the like not shown arranged on engine side. Numerals 41 and 42 designate base current-limiting resistors (R6) and (R7) respectively, numeral 45 a collector resistor (R8), numeral 12 of a third transistor (Q3) for controlling a shift register, and numeral 57 a shift register (SR) having first, second and third output terminals $O_1$, $O_2$ and $O_3$, a reset terminal $\overline{R}$, and an inhibition terminal INH which is connected to the third output terminal $O_3$ and stops counting clock pulses when the output $O_3$ becomes "high". Numeral 56 designates a clock pulse oscillator (OSC), numerals 61, 62 and 63 fourth, fifth and sixth transistors for slowing down control ($Q_4$), ($Q_5$) and ($Q_6$) respectively, numerals 58, 59 and 60 bass current-limiting resistors for the transistors 61, 62 and 63 respectively, and numerals 64, 65 and 66 discharge resistors ($R_{17}$), ($R_{18}$) and ($R_{19}$) respectively having resistance values holding the relationship $R_{17} < R_{18} < R_{19}$ with each other.

Now, the operation of the second embodiment will be explained with reference to the waveforms produced at various parts of the circuit shown in FIGS. 6, 7 and 8.

[I'] When the engine speed is lower than a set value under normal engine operating condition:

The charge-discharge capacitor 4 of the ignition circuit 120 is charged to the polarity shown in the drawing by an output voltage of the voltage generation coil 1 as rectified into a DC voltage by the diode 3. The gate of the thyristor 10, on the other hand, is impressed with a timing signal in FIG. 6(a) produced from the engine speed detection transformer 7, that is, the timing signal generation coil 7 through the diode 8. The thyristor 10, therefore, upon application thereto of a signal, is turned on, and a discharge circuit is formed through the part 4, $\oplus$, part 10, the earth, parts 5 and 4 $\ominus$ in that order thereby to discharge the charges from the capacitor 4, so that a high voltage is generated across the secondary winding of the ignition coil 5 thereby to ignite the plug 6. At the same time as the ignition, a resonation circuit formed of the ignition coil 5 and the capacitor 4 charges the capacitor 4 to the polarity opposite to that for charging. The thyristor 10 is thus reversely biased in blocked state, whereby the charges of the capacitor 4 are discharged through a discharge circuit comprising the part 4 $\ominus$, part 5, part 2, part 3 and 4 $\oplus$ in that order. Subsequently, during each time the gate of the thyristor 10 is supplied with a gate signal based on the detection signal of FIG. 6(a), the charge-discharge operation mentioned above is repeated, thus starting the plug in response to the engine speed.

The waveform shaping circuit 11, on the other hand, supplied with a timing signal shown in FIG. 6(a) generated from the timing signal generation coil 7, applies a "low" level only in response to a $\oplus$ signal input and a "high" level for the remaining time to the base of the transistor 12 as shown in FIG. 6(b). As a result, the first transistor 12 is kept on while the signal is "low" level and charges the capacitor 14 substantially up to the voltage value of the DC power supply $V_{cc}$ as shown in FIG. 6(c).

In the meantime, with an engine fault failing to be detected, the switch 43 is kept off state, and therefore the third transistor 44 is kept on with a base control input continuously applied thereto, so that the DC power supply $V_{cc}$ is ground through the resistors 41, 42 thereby to reduce the reset terminal $\overline{R}$ of the shift register 57 of "low" level. The output level of the first output terminal $O_1$ of the shift register 57 is held "high" level, and the output level of the second and third output terminals $O_2$ and $O_3$ "low" level respectively. Consequently, only the fourth transistor 61 is kept on, while turning off both the fifth and sixth transistors $Q_5$ and $Q_6$. As a result, a discharge circuit including the part 14, part 64, part 61 and the earth in that order is formed, and from the time point $t_1$ shown in FIG. 6(c), the capacitor 14 begins to discharge as shown in FIG. 6(c)

with a discharge time constant ($C_2R_{17}$) determined by the capacitor 14 and the resistor 64.

Now, assume that the detection reference level of the level detector 15 is set to $l_1$ as shown in FIG. 6(c). The output of the level detector 15 assumes a "low" level as shown in FIG. 6(d) during the period from time $t_2$ to $t_3$ when the voltage across the capacitor 14 is lower than the detection reference level $l_1$, and a "high" level during the time period from $t_3$ to $t_4$ when the voltage across the capacitor 14 is higher than the detection reference level $l_1$.

The capacitor 19, on the other hand, which is charged through the resistor 18 by the DC power supply $V_{cc}$, is suppressed at "low" level while the output level of the level detector 15a is "low". When the output level of the level detector 15a becomes "high" at time point $t_0$ in FIG. 6(d) and a reversed bias applied thereto turns off the diode $D_3$, however, the capacitor 19 begins to be discharged in accordance with a charge time constant determined by the circuit constant ($R_4$, $C_3$) due to the resistor 18 and the capacitor 19 as shown in FIG. 6(e). The voltage level of the capacitor 19 steadily increases until it is reduced to zero at time point $t_2$ when the output of the level detector 15a becomes "low".

If the detection level of the second level detector 20 is set to $l_2$ as shown in FIG. 6(e), the output level of the second level detector 20 is "low", and therefore the second transistor 22 with the base thereof controlled thereby is turned off as shown in FIG. 6(f). As a result, the gate input of the thyristor 10 fails to be applied through a bypass, and the plug ignition corresponding to the engine speed is continued, thereby continuing the normal operation at an engine speed below a set value.

[II'] When engine speed increases beyond a set value under normal operating condition:

In the case where the engine speed increases beyond a set value and the output signal cycle of the waveform shaping circuit 11 is shortened as shown in FIG. 7(b) followed by a shortening of the dischargeable time of the capacitor 14 as shown in FIG. 7(c), then the final discharge voltage level thereof is increased. If this final discharge voltage level exceeds the detection level $l_1$ of the level detector 15a, the output level of the level detector 15a continues to be maintained at "high" level as shown in FIG. 7(d), thereby biasing the diode 16 reversely in continuous fashion. The capacitor 19 is thus charged substantially up to a voltage value of the DC power supply $V_{cc}$ in accordance with a charge time constant determined by the circuit constants ($R_4$, $C_3$) due to the resistor 18 and the capacitor 19 as shown in FIG. 7(e). When the charge voltage level exceeds the detection reference level $l_2$ of the second level detector 20 in this process, the output level of the second level detector 20 is raised to "high" level. As a result, the second transistor 22 with the base thereof supplied with the output of the second level detector 20 is turned on as shown in FIG. 7(f), so that the gate input of the thyristor 10 is applied through a bypass thereby to prevent the formation of a discharge circuit for the capacitor 4. The ignition plug 6 is thus subjected to a misfire. This state continues until the engine speed is restored to a set value, thus preventing the damage which otherwise might be caused by an overspeed situation.

Figure 8A:
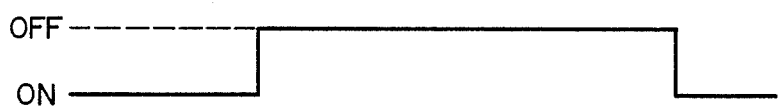
Figure 8B:
Figure 8C:
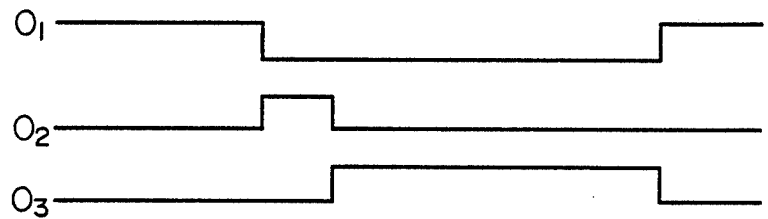
Figure 8D:
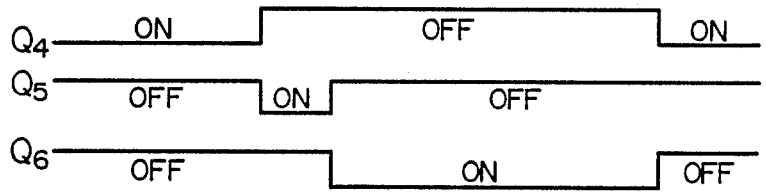
Figure 8E:
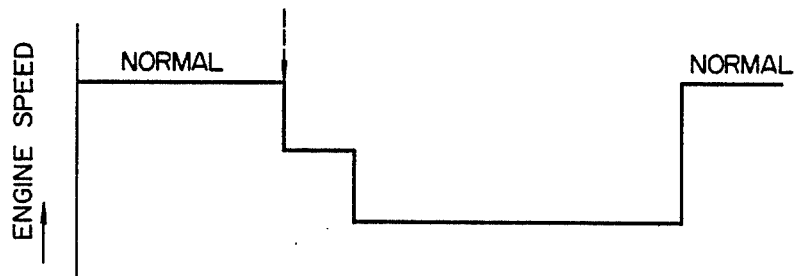

[III'] When slowing down operation start switch 43 is turned on with the engine speed reduced below a set value under normal operating condition:

Suppose that the engine is overheated, and upon detection thereof, the switch 43 for starting a slowing down operation is turned on, as shown in FIG. 8(a). The third transistor 44 is turned off, and the input of the reset terminal $\overline{R}$ of the shift register 57 is raised from "low" to "high" level. As a result, the shift register 57 begins to count the clock pulses shown in FIG. 8(b) produced from the clock pulse oscillator 56, and reduces the output level of the first output terminal $O_1$ which has thus far been "high" to "low" level as shown in FIG. 8(c), while raising the output level of the second output terminal which has thus far been "low" to "high" level. Upon receipt of the next clock pulse, the shift register 57 raises the output level of the third output terminal $O_3$ which has thus far been "low" to "high" level, whereby a "high" input is applied to the inhibition terminal INH thereby to stop the counting of clock pulses. The fourth transistor 61 ($Q_4$), which has thus far been kept on under normal operating condition in synchronism with the clock pulses, is turned from on to off as shown in FIG. 8(d), so that the discharge circuit for the capacitor 14 through the resistor 64 is released and the fifth transistor 62 ($Q_5$) is turned from off to on, thus forming a discharge circuit for the capacitor 14 through the resistor 65. Whenever counted up a predetermined number of the clock pulses under such condition, the fifth transistor 62 ($Q_5$) is turned off while turning on the sixth transistor 63 $Q_6$) thereby to form a discharge circuit through the resistor 66. This discharge circuit through the resistor 66 is maintained until the input level of the inhibition terminal INH is reduced to "low" level, that is, a fault is eliminated and the switch 43 is turned off with the input level of the reset terminal $\overline{R}$ reduced again to "low" level. The resistance values of the discharge resistors 64, 65 and 66 are selected to hold the relationship $R_{17}<R_{18}<R_{19}$ and are in an ascending order. Thus, as seen from a curve of dotted line shown in FIG. 6(c), the discharge time of the capacitor 14 is slower for the resistor 65 than for the resistor 64. Further, the discharge time is delayed more for the resistor 66 than for the resistor 65. Accordingly, as shown by a dotted line in FIG. 6(d), the output level of the first level comparator 15a will remain at "high" level for a progressively longer time, thus steadily lengthening the charge time of the capacitor 19. As a consequence, the charge voltage of the capacitor 19 becomes gradually higher, and the input voltage signal to the second level comparator 20 assumes a voltage level corresponding to an engine speed higher than the actual engine speed is detected, with the result that the gate input of the thyristor 10 is applied through a bypass and a discharge circuit for the capacitor 4 is prevented from being formed to prevent an apparent overspeed operation, thus leading to a misfire. During the reduction in hull speed due to the misfire, a detection signal representing the total engine speed including the turning effort received by the engine from the inertial fluid is constantly compared with a detection level $l_2$ of the level detector 20 while reducing the speed in steps by turning on the transistor 62 and on the transistor 63 in that order.

If the deceleration is too early, therefore, the misfire is suspended temporarily.

Instead of setting the misfire in two steps according to the second embodiment mentioned above, more steps may be involved for a smoother stopping operation.

Upon turning off of the switch 43, the original operation is restored. If the engine is overheated, therefore, the engine may be run at low speed until such an overheated condition is eliminated.

[IV'] When the slowing down operation start switch 43 is turned on with the engine speed exceeding a set value under normal operating condition:

By subjecting the ignition plug to a misfire as mentioned in [II'] above and by turning on the switch 43, the discharge resistor of the capacitor 19 is progressively increased as explained in [III'], so that the detection output level of the engine speed detection circuit is increased stepwise in the same manner as if an engine speed higher than actual speed level is detected, thereby gradually reducing the engine speed.

Figure 10:
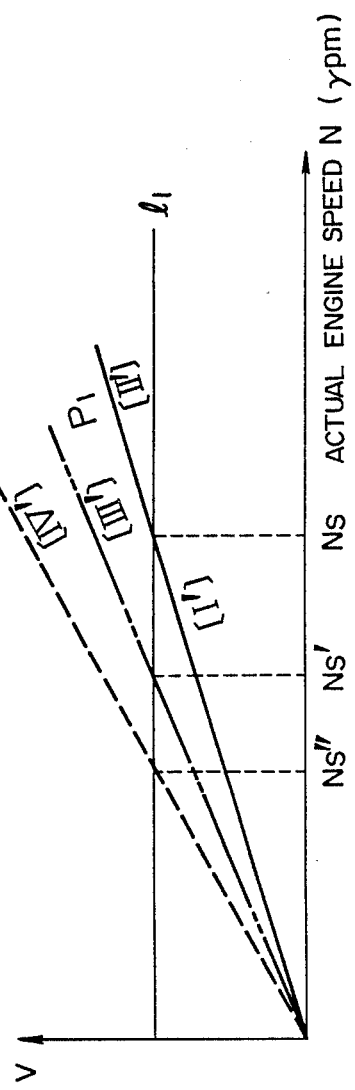

The above-mentioned operation modes [I'] to [IV'] are summarized as below by reference to FIG. 10 schematically illustrating the correlationship therebetween. In FIG. 10, the ordinate represents the detection reference level $l_1$ of the first level detector 15a and the engine speed detection output level $P_1$ of the capacitor 14 in FIG. 5, and the abscissa the actual engine speed N. In the mode [I'] where the engine speed is below a set level $N_s$, the engine speed detection output level $P_1$ of the capacitor 14 increases with the increase in engine speed, but fails to reach the detection reference level $l_1$, thus preventing a misfire. In the mode [II'] where the set engine speed $N_s$ is exceeded, on the other hand, the engine speed detection output level $P_1$ of the capacitor 14 exceeds the detection reference level $l_1$, thus effecting a misfire. Further, in the mode [III'], the resistance for determining the discharge time constant together with the capacitor 14 transfers from the resistor 64 to a large resistor 65, 66, so on sequentially. In other words, a charging process is started from a potential with a large residual charges after discharge of the capacitor 14, so that the charging characteristic thereof shifts to [III'] and [IV'] sequentially. As a result, although a misfire is effected only after the actual engine speed exceeds the set engine speed $N_s$ before the slowing down operation start switch 43 is turned on, a misfire occurs at the actual engine speeds $N_s'$ and $N_s''$ below the set engine speed level $N_s$ once the slowing down operation start switch 43 is turned on. Namely, considering on the basis of the actual engine speed $N_s'$ or $N_s''$ a misfire is caused regarding as if the set engine speed $N_s$, which is not yet reached, is reached and detected. This is the same as in mode [IV'].

It will thus be understood from the foregoing description that according to the second embodiment the amount of reduction in engine speed is capable of being automatically controlled in accordance with the degree of deceleration of hull speed detected by the engine speed detecting circuit. Especially, the automatic control is effected without sharp deceleration, and therefore, smooth speed reduction is assured regardless of the magnitude of the hull resistance. The present invention is thus found useful especially in applications to a small engine for an outboard marine vessel or the like.

We claim:

1. An engine ignition control system comprising an ignition circuit of capacitor charge-discharge type in which the ignition timing is determined by controlling the charge-discharge cycle of an ignition energy-securing capacitor by an engine speed detection circuit, said system further comprising:
   an overspeed control circuit including first comparator means for comparing a detection output signal level from the engine speed detection circuit with a first reference voltage level corresponding to a set engine speed and producing a difference output therebetween, and second comparator means for comparing said difference output from the first comparator means with a second reference voltage level corresponding to the set engine speed, the ignition being stopped in accordance with the output of the second comparator means when the difference output from the first comparator means exceeds the second reference voltage level; and
   a slowing down control circuit actuated by engine slowing down operation start means in such a manner that the first reference voltage level of the first comparator means of the overspeed control circuit is gradually increased thereby to reduce a set engine speed, thereby stopping the ignition in a condition substantially equivalent to the one in which the engine speed detection circuit detects an engine speed higher than the actual engine speed.

2. An engine ignition control system according to claim 1, wherein a lower limit value and an upper limit value of the first reference voltage level representing a set engine speed are set in association with the turning off of the engine slowing down operation start switch and the turning on thereof, respectively, and the first reference voltage level is shifted upward or downward continuously within the range between said upper and lower limit values.

3. An engine ignition control system according to claim 2, further comprising a capacitor connected to a reference input terminal of the first comparator means, a transistor connected in such a manner as to make up selected one of a charge circuit and a discharge circuit for the capacitor in accordance with the turning on or off of the slowing down operation start switch, and a first voltage dividing circuit and a second voltage dividing circuit for applying to the terminals of the capacitor a first voltage defining a lower limit value and a second voltage defining an upper limit value of the first reference voltage level respectively.

4. An engine ignition control system according to claim 1, wherein said engine is one for driving the screw of a small marine vessel.

5. An engine ignition control system comprising an ignition circuit of capacitor charge-discharge type in which the charge-discharge cycle of an ignition energy-securing capacitor is controlled by an engine speed detection circuit thereby to determine an ignition timing, said system further comprising:
   an overspeed control circuit including a capacitor and a charge-discharge circuit for the capacitor for stopping the ignition by the charge-discharge circuit when a detection output signal level from the engine speed detection circuit exceeds a first reference voltage level corresponding to a set engine speed; and
   a slowing down operation control circuit actuated by an engine slowing down operation start means for increasing the detection output signal level from the engine speed detection circuit stepwise thereby to realize a condition substantially equivalent to the one in which the engine speed detection circuit detects an engine speed higher than the actual engine speed, thereby performing the slowing down operation of the engine.

6. An engine ignition control system according to claim 5, further comprising a level detector for comparing a detection output signal level of an engine speed detection circuit with a reference voltage level corresponding to a set engine speed, and a plurality of discharge circuits connected to the level detector supplied with said detection output signal level, said discharge circuits being switched selectively in accordance with the energization of the slowing down operation start means.

7. An engine ignition control system according to claim 6, further comprising:
- a capacitor charged and discharged in synchronism with engine revolutions;
- a plurality of time constant-determining circuits including a resistor and a transistor in series and forming charge-discharge circuits of the capacitor with different time constants; and
- a shift register including a plurality of outputs connected to a plurality of said time constant-determining circuits respectively, a reset input, a clock input and an inhibition input;

wherein a reset signal is applied to the shift register by the turning on of the slowing down operation start switch thereby to start counting a predetermined clock input, and said time constant-determining circuits are sequentially switched selectively in accordance with the count values sequentially appearing at the outputs of the shift register, thereby increasing the detection output signal level of the engine speed detection circuit stepwise.

8. An engine ignition control system according to claim 5, wherein said engine is one for driving the screw of a small marine vessel.

* * * * *